Patented July 27, 1926.

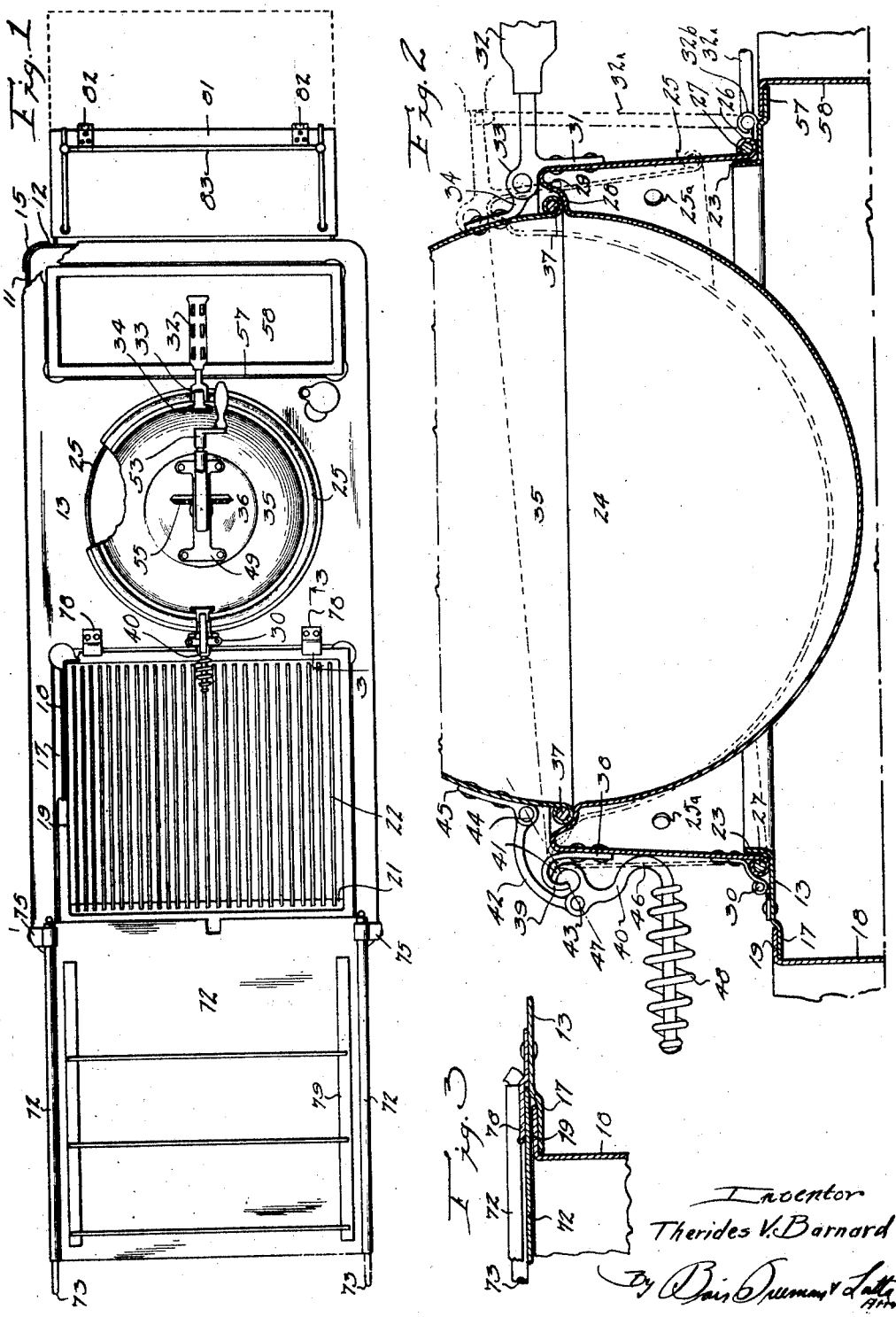

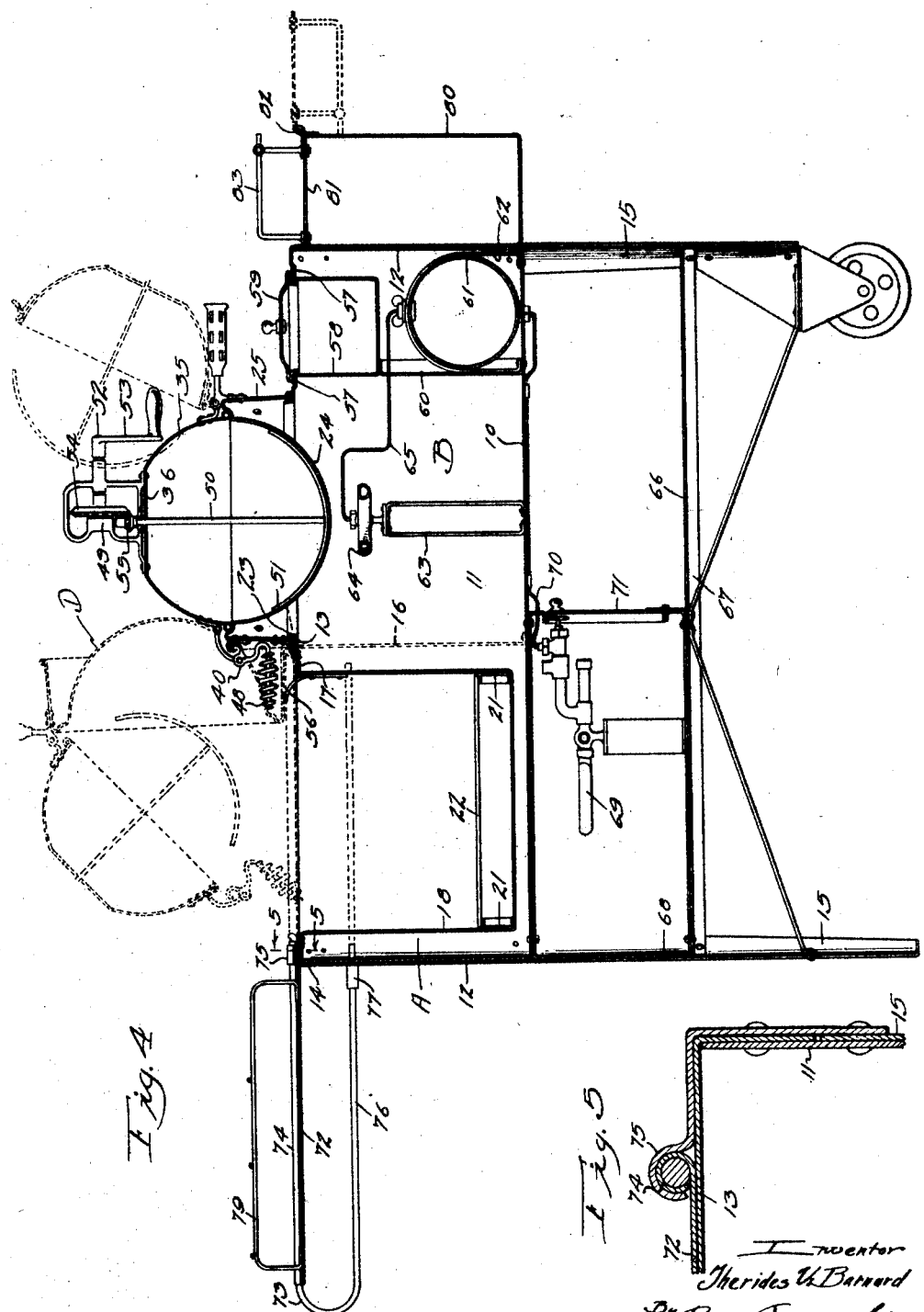

1,594,190

UNITED STATES PATENT OFFICE.

THERIDES V. BARNARD, OF SCHALLER, IOWA.

COMBINED CORN POPPER AND CAMP STOVE.

Application filed May 18, 1925. Serial No. 31,002.

My invention relates to a corn popping machine which may be used as a camp stove as well as for popping and vending pop corn.

It is my object to provide in a machine of this class a supporting stand having a receptacle for popped corn and a popping kettle hinged to the stand in such a manner that it will normally rest above a burner, and may be tilted upon its side in such a position that the popped corn from within the kettle will be allowed to slide from the kettle into the receptacle.

A further object is to provide an arrangement wherein the kettle is provided with a cover hinged thereto on the side which occupies an upper position when the kettle has been tilted, as mentioned in the preceding paragraph, whereby the cover may be swung away from the kettle to a position where it will not interfere with the exit of the popped corn, the cover serving to support a stirring finger, and the kettle being of such shape that the cover may hinge upon its side and the stirring finger therewith be removed from the kettle without interference or binding.

Another object is to provide a simple and effective latching device to lock the cover against the kettle when in lowered position, the latching device being adapted to move to locking position automatically by the swinging of the cover against the kettle, and a handle being provided to raise the kettle, which is diametrically opposed to the latching device in order to render the manipulation of the kettle very convenient and easy for the operator.

A further object is to provide a novel arrangement of the kettle and adjacent top of the stand, the kettle being provided with a downwardly-extending skirt encircling and spaced from the kettle proper, and registering with a flanged opening in the stand top, a heating device being positioned centrally below the kettle and the parts being so designed that the heat therefrom will flow upwardly around the sides of the kettle proper to the upper extremity thereof, and will thence escape downwardly through the holes, the skirt serving to trap the heat and preserve a body of uniformly heated air around the lower side of the kettle.

Another object of my invention is to provide a novel screen or false bottom for the popped corn receptacle, from which the corn may be scooped without crushing the kernels.

A further object is to provide a novel sack tray which may be moved to serve as a cover for the popped corn receptacle.

A further object is to provide an auxiliary peanut receptacle having a combined lid and sack-supporting tray hinged to one edge thereof, the sack-supporting tray being provided with a guard rail adapted to serve as a bracket to support the tray in horizontal inverted open position.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:—

Fig. 1 is a plan view of the device, parts being broken away to better illustrate the construction.

Fig. 2 is an enlarged vertical longitudinal sectional view through the popping kettle and a portion of the cover and adjacent top of the stand.

Fig. 3 is a detail sectional view taken on the line 3—3 of Fig. 1.

Fig. 4 is a central vertical longitudinal sectional view through the machine.

Fig. 5 is a detail sectional view taken on the line 5—5 of Fig. 4.

The stand portion of my machine is made up of a number of box-like units of sheet metal, suitably secured together. An upper large compartment has the bottom, 10, of sheet metal, the sides, 11, and ends, 12, bent upwardly therefrom. The top, 13, is made of a single sheet of metal, having the downwardly drawn annular flange, 14, which receives the upper edges of the sides and ends, 11 and 12, respectively, and is suitably secured thereto as by soldering, riveting or spot welding.

In order to give a finished appearance to the machine the corners formed by the juncture of the sides, 11, and ends, 12, are rounded off, as shown in Fig. 1, and legs, 15, serve to secure the adjacent edges together and to support the remainder of the compartments.

The upper compartment may be subdivided by a transverse partition, as indicated in dotted lines at 16 in Fig. 4, so as to provide the space, A, in which the popped corn receptacle is situated, and the space, B, into which the lower portion of the kettle projects.

The top, 13, above the space, A, is provided with a rectangular opening, bordered by the depressed flanges, 17 (see Figs. 1, 2 and 3).

The popped corn receptacle, 18, is of rectangular form to fit within the opening just mentioned, and is provided at its upper edge with outwardly-projecting flanges, 19, which rest upon the depressed flanges, 17, the upper surfaces thereof being slightly below the level of the top, 13.

Secured to brackets, 21, in the bottom of the receptacle, 18, are a number of longitudinally extending parallel bars, 22, which form a false bottom or grate, upon which the popped corn will rest, and through which the unpopped kernels will fall. In scooping corn from the receptacle the scoop is moved longitudinally of the bars, 22, and the kernels will be scooped up without catching against any transversely-extending members, as would be the case were meshing to be used instead of the parallel bars. Thus there is no likelihood of the kernels being crushed.

Adjacent one side of the receptacle opening, just described, is a circular opening bordered by an upstanding flange, 23, drawn from the metal of the top, 13.

The kettle comprises two elements; a semi-spherical kettle proper, 24, and an integral apron, 25, extending downwardly from the upper edge of the bowl, spaced somewhat therefrom and preferably flaring outwardly slightly, as shown in the drawings.

The kettle is spun from a sheet of aluminum or copper, and the lower edge of the apron is beaded, as at 26, to give strength, which may be increased by the additional reinforcing rod, 27.

The lower edge of the apron is designed to encircle the flange, 23. In order that the heated gases may escape, openings, 25ª, are provided in the apron, 25.

In forming the juncture between the kettle proper, 24, and the apron, 25, a depressed shoulder, 28, is provided which leaves an upstanding encircling shoulder, 29.

The kettle is hinged to the top, 13, by means of a hinge, 30, secured thereto and secured to the apron, 25, in a position centered between the side extremities of the top, 13.

At a point diametrically opposed to the hinge, 30, a handle bracket, 31, is secured to the apron, 25. The bracket, 31, carries the handle, 32, and is provided with a pair of spaced ears, 33, receiving a lug, 34, fastened to the cover, 35, and forming therewith a hinge.

The cover, 35, is in the form of a semi-sphere with a flattened portion, as at 36 (see Fig. 4), and is spun of the same metal as the kettle. The lower edge of the cover, 35, is beaded and provided with a reinforcing band, 37, the mouth of the cover being of such diameter that the bead will rest against the shoulder, 28, and within the shoulder, 29.

The shoulder, 29, is inclined inwardly a little so that as the cover is lowered to register with the kettle the shoulder, 29, will serve to guide it into accurate position whereby the stirring finger, which will later be described, will be brought into close engagement with the interior of the kettle.

This is important inasmuch as a single hinge, in which a small amount of lateral play is allowed, is used.

Directly above the hinge, 30, a keeper, 38, is secured to the apron, 25, and is curved outwardly at its upper end to provide a hook, 39. A latch, 40, is provided which has a curved finger, 41, adapted to extend into the hook, 39, and engage the inner surface thereof, and is linked to the cover, 35, by means of a link, 42, hinged at 43, to the latch, 40, and at 44, to a bracket, 45, secured to the cover. The latch, 40, has a curved shoulder, 46, adapted to engage the apron, 25, after the end of the finger, 41, has moved upwardly into the hook, 39, beyond the center line (indicated at 47) connecting the two hinge pivots, 43 and 44.

The end of the latch, 40, is thence extended outwardly and provided with a handle, 48.

The parts are so arranged that in order to move the finger, 41, downwardly toward unlatched position from the position shown in Fig. 2, the finger, 41, must increase its pressure against the hook, 39, and thus to spread the pivots, 43 and 44, further apart. Thus the resiliency of the parts, aided by the weight of the handle, 48, will effectively serve to maintain the latch in locked position.

In emptying the corn from the kettle the handle, 32, is grasped by the left hand of the operator and the kettle tipped upwardly about the hinge, 30, to the position shown in dotted lines at D in Fig. 1. Simultaneously the operator grasps the handle, 48, with the right hand, unlatches the cover and swings it on further in the same direction, thereby allowing the corn to drop perpendicularly from between the two halves of the kettle.

The spherical contour of the kettle proper allows the corn to slide freely therefrom when in the position shown, and I find that the momentum of the sliding kernels will cause the kettle to be cleared of all of the corn so that no kernels remain. Thus the dumping operation is quickly effected, and upon swinging the kettle back to its original position the cover may be simply allowed to drop by gravity, the momentum of the swinging handle serving to overcome the resistance of the hook, 39, to the latching finger, 41, when the latching is being effected.

Mounted in a bracket, 49, secured to the flattened top, 36, of the cover, and extending through said top to a point near the bottom of the kettle is a stirrer shaft, 50, to the lower end of which is secured a single stirrer, 51, which is preferably welded to the shaft and is curved to fit the contour of the kettle.

An ordinary drive mechanism comprises a shaft, 52, journaled in the bracket, 49, provided at its outer end with a gear handle, 53, and at its inner end with a crown gear, 54, and a bevel pinion, 55, secured to the shaft, 50, and meshed with the crown gear, 54.

It will now been seen that as the cover is swung away from the center, the stirring finger, 51, will swing on an arc which is approximately coincidental with the arc of the kettle, 24, although having a slightly larger radius.

As a result, the finger, 51, will swing clear of the kettle when the cover is lifted, without binding.

When the kettle is not in use, it is raised to the position shown in dotted lines in Fig. 2, thus preventing scorching. A bracket, 32$^a$, hinged at 32$^b$, supports the kettle in this position.

A bracket, 56, limits the tipping movement of the kettle to the position shown in dotted lines in Fig. 3.

Beyond the kettle the top, 13, is apertured and flanged, as at 57, in a manner similar to the construction described for the popped corn receptacle, to receive a warming pan, 58.

A cover, 59, is provided for the pan, 58. A partition, 60, extends transversely of the upper compartment, is secured to the sides, 11, and encloses, together with the pan, 58, a space next to the end wall, 12, in which the gasoline tank, 61, is secured by means of brackets, 62.

Supported on a bracket, 63, below the kettle, 24, is a burner, 64, which may be supplied with fuel from the tank, 61, by means of a hollow wire connection, 65. The parts described form no part of my present invention and therefore have not been illustrated in detail.

The heated gases rising from the burner, 64, will strike the bottom of the kettle, 24, near its center, and will spread outwardly on all sides thereof until the upper limit of space between the kettle and apron, 25, is reached. Thence the only avenue of escape for the gases is through the openings, 25$^a$, in the apron, 25, and the cooling gases will therefore be forced downwardly through the openings in the face of the apron by the ascending current of hotter gases from the burner.

Since it is necessary for the heated gases to pursue a downward course in escaping from the machine, it will be seen that it will not be necessary to allow as large a volume of heated gases to rise around the bowl as would be needed to provide the same heating capacity were the apron eliminated and the gases allowed to escape directly from the upper edge of the bowl.

In short, the gases are trapped in the space between the apron and the bowl so as to be maintained in contact with the bowl a maximum length of time, and in the operation of the machine it will be found that a very small flame from the burner, acting directly against the bottom of the kettle, will maintain the lower portion of the kettle at practically the same temperature as the upper portion, which is constantly surrounded with an envelope of heated gases.

By thus subjecting a large surface of the kettle to the action of the heated gases, the air within the kettle is quickly brought to the proper temperature for popping, and the bursting of the kernels is more completely accomplished by the heating of the air within the kettle than is the case where the bottom of the kettle is subjected to a much higher temperature than the remainder. As a result, a more uniform popping is obtained, fewer unpopped kernels are left in the kettle and the danger of scorching is minimized.

A shelf, 66, of sheet metal, having a drawn flange, 67, is secured to the legs, 15, and supports at one end of the machine an enclosed sheet metal box, 68, in which is secured an auxiliary burner, 69, similar in construction to the burner, 64, and supplied from the tank, 61, by means of a hollow wire, 70. A door, 71, in the end wall of the box, 67, allows access to the burner.

The burner, 69, may be used to warm the receptacle, 18, and when the machine is used as a camp stove the receptacle, 18, serves the purpose of an oven.

To this end I provide means for covering the compartment, 18, which I will now describe.

A cover plate of sheet metal, 72, has its side edges rolled around rods, 73, as at 74. The rolled edges, 74, are slidably received under brackets, 75, secured to the sides of the machine, as illustrated in Fig. 5. The rods, 73, are bent upon themselves to provide parallel portions, 76, which are slidably mounted in bushings, 77, secured to the end walls, 12, vertically below the brackets, 75.

The space between the side walls of the receptacle, 18, and the sides, 11, of the upper compartment is sufficient to allow the inward sliding of the portions, 76, of the rods, 73, when the cover member, 72, is slid to the dotted line position shown in Fig. 4.

When in closed position the end edge of the cover, 72, is received under a pair of keepers, 78, secured to the top, 13, as illustrated in Fig. 3. The cover, 72, when in the extended position shown in Fig. 4 in full lines, serves as a shelf to support sacks of popcorn, and a rack, 79, is secured thereto to maintain the sacks in upright position.

An auxiliary container, 80, is secured to the other end wall, 12, of the upper compartment, and is normally closed by a cover, 81, hinged at 82, to the outer edge thereof. A rack, 83, is secured to the cover, 81, in such position as to form a brace to maintain the cover in inverted horizontal position, as illustrated in dotted lines in Fig. 4, when the cover is swung back on the container. When in this position the cover serves as an additional shelf. The compartment, 80, may be used for storing sacks of peanuts and the like.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:—

1. In a corn popping machine a stand having a top, side and end walls, a receptacle entirely depending from the top wall near one end of the stand, and a tray having an upwardly projecting rack, said tray being slidably mounted on the top wall of the stand and adapted to move from position projecting beyond the end of the stand to position covering said receptacle.

2. In a corn popping machine, a stand having a top, side and end walls, a receptacle depending from the top wall near one end of the stand and spaced from the side walls thereof, a tray, brackets secured to the stand and extending over the side edges of the tray, the tray being adapted to slide under said brackets from position extending beyond the end of the stand to position covering the receptacle, and a pair of rods secured to the tray at the outer end thereof, and positioned under and parallel to the tray, said rods being slidably mounted relative to the end wall of the stand and receivable between the side walls of the receptacle and of the stand, respectively, when the tray is in position covering the receptacle.

3. In a corn popping machine, a stand having at one end a container, a cover hinged to the outer edge of said container, and a rack on said cover positioned to project upwardly when the cover is over the container and to serve as a bracket to support the cover in horizontal position as a tray when the cover is swung away from the container.

4. In a corn popping machine, a stand having a top wall, said wall being provided with a circular opening, an upstanding flange formed around said opening, a burner below said opening, a receptacle depending from said top wall adjacent said opening, and a popping kettle comprising a kettle proper and a skirt depending from the upper edge of the kettle proper and spaced therefrom, said skirt being received over said flange and hinged to the top at a point between the opening and the receptacle, whereby the kettle may be swung upwardly to position to discharge corn popped therein into said receptacle.

5. In a corn popping machine, a stand having a top wall, a receptacle depending from said top wall, said top wall having an opening adjacent said receptacle, a popping kettle hinged to the top wall between the opening and the receptacle, a cover hinged to the kettle at a point diametrically opposite the hinge between the kettle and the top, the parts being so arranged that the kettle may be swung from a position over the opening to a position where the contents will be discharged into the receptacle, and the cover swung therebeyond in the same direction to allow discharge of the goods.

6. In a corn popping machine, a stand having a top wall, a receptacle depending from said top wall, said top wall having an opening adjacent said receptacle, a popping kettle hinged to the top wall between the opening and the receptacle, a cover hinged to the kettle at a point diametrically opposite the hinge between the kettle and the top, the parts being so arranged that the kettle may be swung from a position over the opening to a position where the contents will be discharged into the receptacle, and the cover swung therebeyond in the same direction to allow discharge of the goods, and a latch adapted to automatically lock the cover to the kettle when the kettle is swung back to position over the opening.

7. In a corn popping machine, a stand having a top wall, a receptacle depending therefrom, said top wall having an opening adjacent said receptacle, a popping kettle hinged to the top wall between the receptacle and the opening, and adapted to normally rest over the opening, a cover hinged to the kettle at a position diametrically opposite to the hinge between the kettle and the top, and a stirrer depending from the cover and having a stirrer finger adapted to register with the inner surface of the kettle when the cover is closed, said kettle being semi-spherical on its inner surface, so as to allow hinging of the cover and consequent removal of the stirring finger without interference between the kettle and the finger.

8. In a corn popping machine, a stand having a top wall, said wall being provided with a circular opening, a burner below said opening, a receptacle depending from said top wall adjacent said opening, and a popping kettle comprising a kettle proper and a skirt depending from the upper edge of the kettle proper and spaced therefrom, said skirt encircling said opening and hinged to the top at a point between the opening and the receptacle, whereby the kettle may be swung upwardly to position to discharge corn popped therein into said receptacle.

9. In a corn popping machine, a stand having a top wall, a receptacle depending from said top wall, said top wall having an opening adjacent said receptacle, a popping kettle hinged to the top wall between the opening and the receptacle, a cover hinged to the kettle at a point diametrically opposite the hinge between the kettle and the top, the parts being so arranged that the kettle may be swung from a position over the opening to a position where the contents will be discharged into the receptacle, and the cover swung therebeyond in the same direction to allow discharge of the goods, and means to automatically lock the cover to the kettle when the kettle is swung back to position over the opening, said means comprising a keeper secured to the kettle, a latch secured to the cover by a link allowing swinging thereof in a vertical direction, said latch having a finger to engage the keeper and a handle so disposed that its weight will tend to urge the finger into engagement with the keeper when the kettle and cover are in positions over the opening and closed, respectively.

Signed at Schaller, in the county of Sac and State of Iowa, this 11th day of May, 1925.

THERIDES V. BARNARD.